April 7, 1953
J. A. DOOLEY
2,633,580
BABY BASSINET ROCKING DEVICE
Filed Aug. 17, 1948
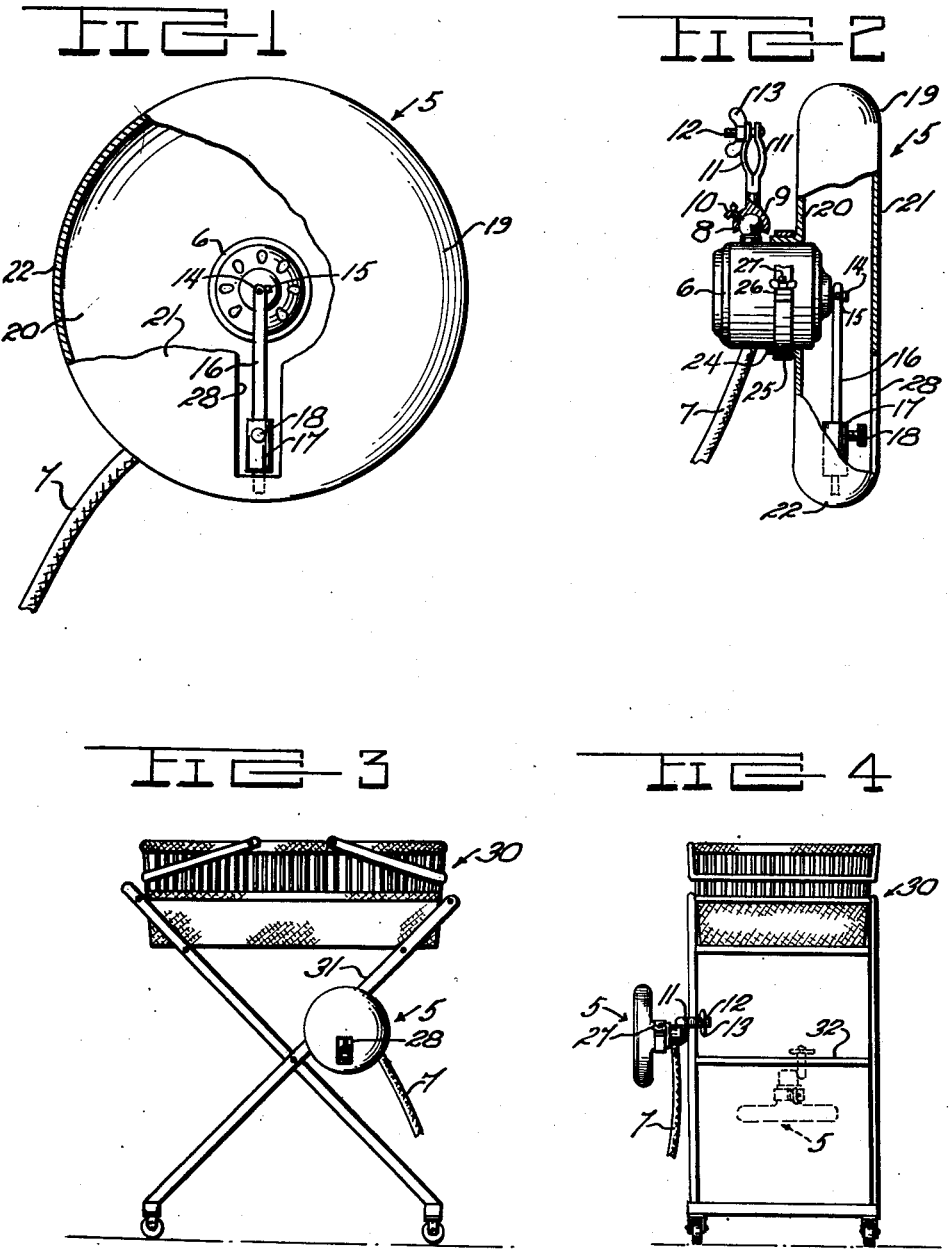
INVENTOR.
JOSEPH A. DOOLEY
BY
McMorrow, Berman + Davidson
ATTORNEYS Patented Apr. 7, 1953

2,633,580

UNITED STATES PATENT OFFICE 2,633,580

BABY BASSINET ROCKING DEVICE

Joseph A. Dooley, Chicago, Ill.

Application August 17, 1948, Serial No. 44,628

1 Claim. (Cl. 5—109)

This invention relates to a motorized attachment for installation on a baby buggy, bassinet, cradle or the like to vibrate or oscillate the same while unattended, the primary object of the invention being to provide a compact and efficient device of this character which can be quickly detachably connected to and removed, and which can be installed on different makes and models without alteration or mutilation of the baby buggy, bassinet, cradle or the like.

Another important object of the invention is the provision of a device of the above indicated character involving a pendulum arm supported for rotation on a motor shaft whose axis may be disposed in different horizontal and vertical positions to produce the desired vibrating or oscillating of the baby buggy or the like, the pendulum arm having a weight which can be adjusted therealong to increase or decrease the eccentric oscillating motion imparted to the baby buggy or the like by the rotation of the motor shaft.

Other important objects and advantageous features of the invention will be apparent from the following description and accompanying drawings, wherein, merely for present purposes of illustration, a specific embodiment of the invention is set forth in detail.

In the drawings:

Figure 1 is a side elevation of the illustrated device, partly broken away to show internal structure.

Figure 2 is an edge elevation on a reduced scale, partly broken away to show internal structure.

Figure 3 is a side elevation showing the device installed on a folding bassinet, and, Figure 4 is a right hand end elevation of Figure 3, showing in dotted lines another installation of the rocking device.

Referring in detail to the drawings, the illustrated rocking device, generally designated 5 comprises a small, low speed electric motor 6 having a current supply conduit 7 leading therefrom to a suitable current source (not shown) and having on the peripheral wall thereof a ball 8, forming part of a ball-and-socket joint including the socket 9 embracing the ball 8 and having a set-screw 10 for locking the socket in adjustment on the ball. The socket 9 terminates in oppositely bowed clamping legs 11, 11 whose outer ends are traversed by a clamping bolt 12 having a wing nut 13.

The motor shaft 14 has fixed thereon, as by means of a set screw 15 or the equivalent, a radial pendulum arm 16 which may be a round or square bar, along which is slidable a cylindrical weight 17 having a thumb set screw 18 by means of which the weight may be locked in a selected position along the arm 16.

Protectively enclosing the arm 16 including the weight 17 in a guard 19 in the form of a flat cylinder of lightweight metal or non-metallic material, having flat sides 20, 21 and a rounded peripheral wall 22, the inside diameter of the guard being only slightly greater than twice the radial length of the arm 16. The side 20 is formed with a circular axial opening to singly receive the motor 6 with the arm 16 midway between the guard sides 20, 21, as shown in Figure 2. Around the opening is an annular flange 24 embracing the outside of the motor 6, on which is circumposed a flat clamping ring 25, whose lug ends 26, 26 are traversed by a clamping bolt 27 by means of which the guard 19 and motor 6 are securely assembled together. The wall 21 of the guard is provided with a radial slot 28 affording access for adjustment of the weight 17 along the arm 16.

As shown in Figures 3 and 4, the device is adapted to be installed with the axis of the rotary pendulum arm 16 in either a vertical or a horizontal position, as may be necessary to produce the desired rocking or swaying of the bassinet, 30, by clamping the legs 11, 11 around a suitable rod or bar element of such as a bassinet, such as the diagonal element 31 or the horizontal element 32.

When the electric motor 6 is started, the arm 16 swings around the axis of the motor shaft 14 and oscillates the bassinet. This oscillation may be reduced or increased in amplitude by adjusting the weight 17 radially inwardly along the arm 16 and radially outwardly along the arm 16, respectively. It will be obvious that the present invention embraces motor means other than the electric motor illustrated herein.

What is claimed is:

In a device for oscillating a bassinet or the like, a flat circular casing having one end wall provided with a concentric circular opening, a flange on said one end wall around said opening, a slow speed motor secured in said flange, a clamp rotatably secured to said motor, means locking said clamp in adjusted rotated position relative to said motor, said clamp being arranged to engage a bassinet or the like for detachably securing the motor and casing thereto, said motor having a rotary shaft supported within the casing with the inner end of the shaft extending axially of said casing, an elongated arm disposed within said casing and having one end secured to said shaft for rotary movement therewith, said arm extending radially within the casing a cylindrical, sleeve-like weight circumposed about the other end of said arm and slidably supported thereon, and means operatively connected to said arm and said weight for positioning the latter at selected points along said arm, said means comprising a thumb set screw threaded radially through the wall of said weight and clampingly engageable with said arm, the opposite end wall of the casing being formed with a radial slot of substantial length affording access to said thumb set screw for adjusting the position of said weight, whereby the amplitude of oscillation of the bassinet produced by the weight may be adjusted from outside said opposite end wall of the casing without disengaging said clamp from the bassinet.

JOSEPH A. DOOLEY.

REFERENCES CITED

The following references are of record in the file of this patent:

UNITED STATES PATENTS

| Number | Name | Date |
| --- | --- | --- |
| 522,783 | Dewey | July 10, 1894 |
| 587,014 | Packard | July 27, 1897 |
| 597,168 | Millard | Jan. 11, 1898 |
| 859,674 | Lindstrom | July 9, 1907 |
| 868,795 | Miller | Oct. 22, 1907 |
| 1,017,840 | Amet | Feb. 20, 1912 |
| 1,106,893 | Sabatino | Aug. 11, 1914 |
| 1,420,134 | Nisle | June 20, 1922 |
| 1,524,416 | Waitekaites et al. | Jan. 27, 1925 |
| 1,676,420 | Anderson | July 10, 1928 |
| 1,704,914 | Fairweather | Mar. 12, 1929 |
| 2,319,037 | Castiglia | May 11, 1943 |
| 2,374,492 | Mininberg | Apr. 24, 1945 |